Nov. 13, 1956  G. BADALINI  2,770,099
ROTARY PUMP AND MOTOR HYDRAULIC TRANSMISSION
AND SPEED VARYING MECHANISM THEREFOR
Filed Jan. 24, 1951  2 Sheets-Sheet 2
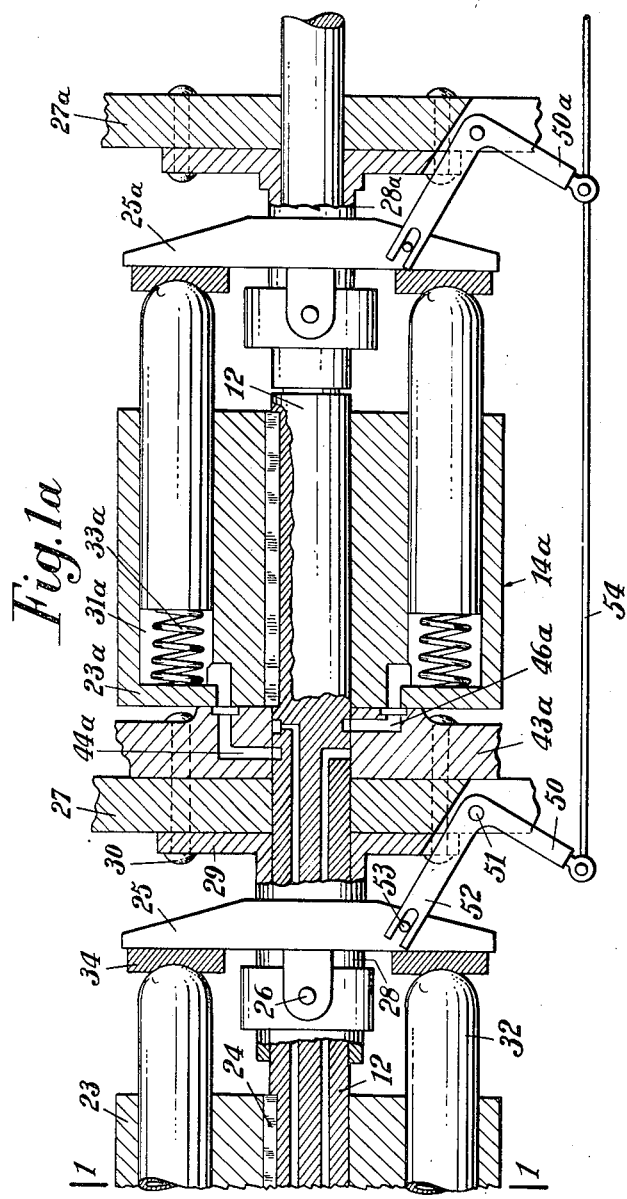
INVENTOR
GIOVANNI BADALINI

United States Patent Office 2,770,099
Patented Nov. 13, 1956

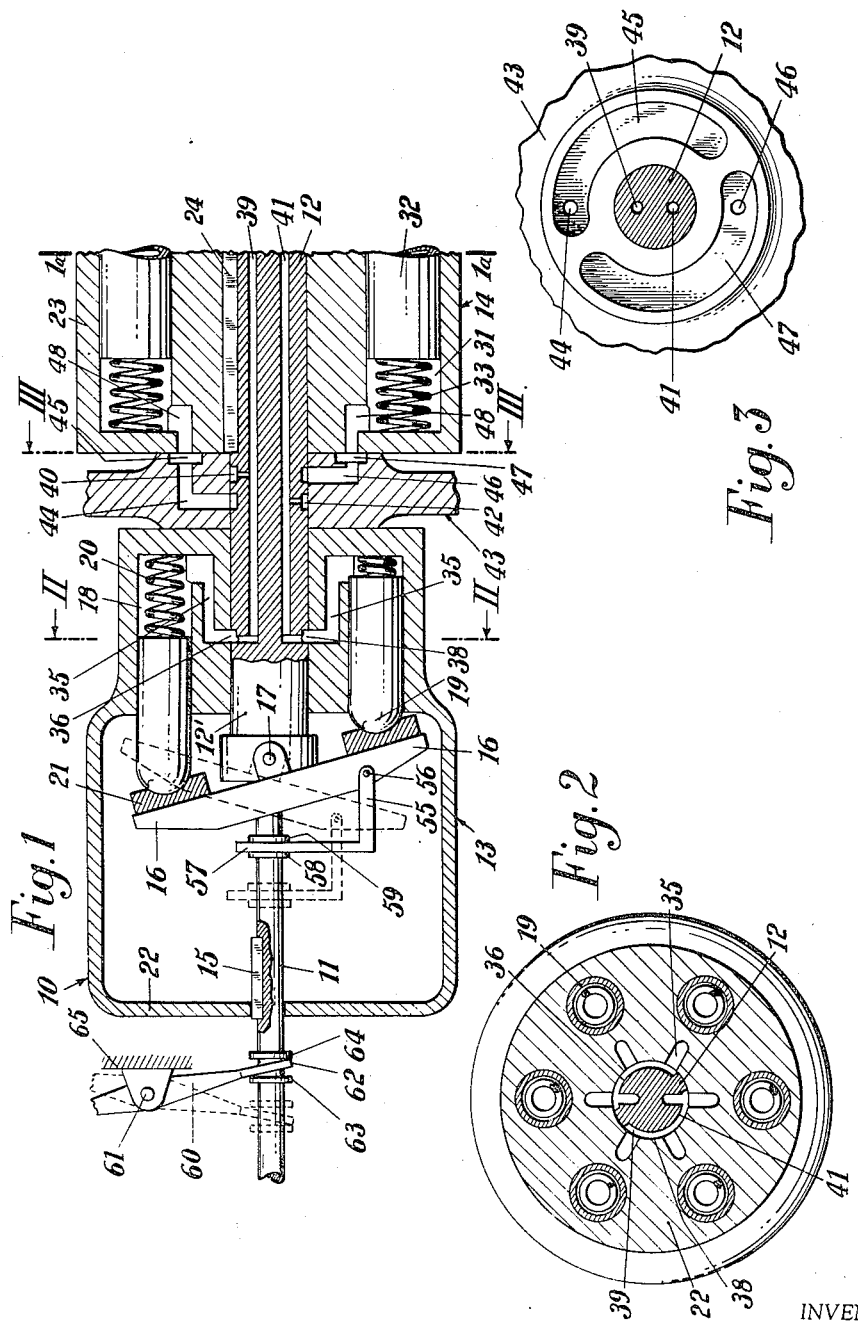

2,770,099

ROTARY PUMP AND MOTOR HYDRAULIC TRANSMISSION AND SPEED VARYING MECHANISM THEREFOR

Giovanni Badalini, Milan, Italy

Application January 24, 1951, Serial No. 207,464

Claims priority, application Italy March 3, 1947

4 Claims. (Cl. 60—53)

The present invention relates to hydraulic operated speed changing devices, more particularly to devices of this character wherein a pump having an inclined wobble plate or swash plate cooperates with a first set of pistons to supply fluid to a hydraulic motor having a second set of pistons which bear against a guide plate or cam plate, whose variable inclination determines the stroke of the pistons and, thereby, the speed differential between the body of the pump and the swash plate, this differential in turn determining the transmission ratio between two shafts coupled, respectively, to the pump body and to the swash plate. A device of this character has been described in my copending application, Serial Number 768,149, filed August 12, 1947, which has now become abandoned and of which the present application is a continuation-in-part.

If, at a particular inclination of the pump swash plate, the inclination of the motor cam plate is increased, the transmission ratio is increased; if the cam plate becomes perpendicular to the axis of the motor body, then the stroke of the motor pistons is reduced to zero and the transmission ratio becomes substantially unity. Inclination of the cam plate in the opposite sense would theoretically result first in an overdrive until, with progressively increased reverse inclination, the transmission ratio goes through infinity to become finally negative, i. e. the sense of rotation of the driven shaft relative to the drive shaft is reversed. In practice it is, of course, impossible to pass in this manner continuously from forward to rearward drive, hence a release of pressure becomes necessary when it is desired to throw the drive system into reverse.

An object of the present invention is to provide means enabling the continuous shifting from direct drive to reverse by causing the transmission ratio to go through zero, rather than infinity, during speed reversals.

This may be obtained in an easy way, by varying the inclination of the wobble plate in a direction opposite to that corresponding to the direct drive.

Another object of my invention is to provide means enabling a reduction in piston pressure upon the respective plates when a reduced torque is to be transmitted, e. g. when the cam plate assumes a perpendicular position for direct drive.

A further object of this invention is to provide means for connecting in tandem a plurality of devices of the character set forth so as to increase the power output of the drive system.

These and other objects will become apparent from the following description of a preferred embodiment, reference being had to the accompanying drawing in which:

Figs 1 and 1a are, respectively, longitudinal, partly sectional views of different portions of a speed changing device according to the invention, Fig. 1 showing a pump and one half of a first motor, and Fig. 2 showing the other half of said first motor as well as a second motor connected in tandem therewith, with the portions to be connected along the line 1a—1a in Fig. 1 and 1—1 in Fig. 1a; and Figs. 2 and 3 are sections taken on lines II–II and III–III of Fig. 1, respectively.

Referring to the drawing, there is shown a speed changing device 10, a drive shaft 11, and a driven shaft 12 forming part of the device 10. The device 10 comprises a pump generally designated 13 and two motors generally designated 14 and 14a, the former of these motors being shown partly in Fig. 1 and partly in Fig. 1a, and the latter of the motors being shown in Fig. 1a. The pump 13 comprises two relatively rotatable elements, namely, a housing 22 keyed to the shaft 11 at 15 and a wobble plate or swash plate 16 pivoted to the shaft 12 at 17. The housing 22 has six cylindrical chambers 18 wherein a set of pistons 19, urged by springs 20 against the swash plate 16, are reciprocable; each of these pistons has a rounded head received in a respective shoe 21 slidably bearing against the swash plate 16. The motor 14 similarly comprises two relatively rotatable elements, namely, a housing 23 keyed to the shaft 12 at 24 and a guide plate or cam plate 25 (Fig. 1a) pivoted at 26 to a stationary stub shaft 28 which is provided with a flange 29 fixed to wall 27 by bolts 30. The housing 23 is formed with six cylindrical chambers 31 wherein a set of pistons 32, urged by springs 33 against the cam plate 25, are reciprocable, each of these latter pistons also having a rounded head received in a respective shoe 34 slidably bearing against the cam plate 25.

Certain of the chambers 18, namely, those which happen to be in a predetermined position relative to the swash plate 16, are connected over a system of channels with certain of the chambers 31, namely, those which happen to be in a predetermined position relative to the cam plate 25. As here shown, the system of channels comprises a set of six ducts 35, three of which lead, in the position illustrated, from the uppermost chamber 18 and from the two chambers shown on the right hand side in Fig. 2 to a peripheral groove 36 which extends halfway around the shaft 12; the other three ducts 35 leading, at this particular instant, from the lowermost chamber 18 and from the two chambers shown on the left hand side in Fig. 2 to a peripheral groove 38 extending halfway around the shaft 12 opposite to the groove 36. Groove 36 communicates with a bore 39 leading within the shaft 12 to an annular groove 40 extending completely around the shaft 12 between the housings 22 and 23; groove 38 similarly communicates with a bore 41 leading within the shaft 12 to an annular groove 42 extending completely around the shaft 12 adjacent the groove 40 in the space between the two housings. This space is occupied by a stationary partition member or distributor plate 43 against which the housings 22 and 23 are slidingly urged by the springs 20 and 33, respectively, so that a substantially fluid-tight seal is formed; inside this member, a duct 44, communicating with the groove 42, opens into a semi-annular groove 45 provided on the face of member 43 adjoining the housing 23, while another duct 46, communicating with the groove 40, opens into a similar groove 47 provided on the same face of member 43 in concentric position with respect to opposite groove 45, as best seen in Fig. 3. A short channel 48, leading from each of the chambers 31 towards the adjacent face of member 43, connects the associated chamber 31 either with the groove 45 or with the groove 47, depending on the position of housing 23.

In accordance with an important feature of the invention, the inclination of both the wobble or swash plate 16 and the cam or guide plate 25 may be varied. In the case of plate 25, which is rotationally stationary, this is accomplished in simple manner by a bell crank lever 50 which is pivoted to the wall 27 at 51 and is provided with a forked extremity 52 engaging a stud 53 projecting from the plate 25. A linkage, indicated schematically at 54, may be used to operate the lever 50 with a similar lever 50a on the motor 14a and with like levers on other motors if such are used in the system.

Means for varying the inclination of the plate 16 has been shown in the form of a bell crank lever 55 which is pivoted to the plate 16 at 56 and has a forked extremity 57 straddling the shaft 11 between two collars 58, 59; a lever 60 is pivoted to a stationary wall 65 at 61 and has a forked extremity 62 straddling the shaft 11 between two collars 63, 64.

The system, according to the invention, may comprise only the two devices 13 and 14, that is a pump and a motor like those illustrated and mentioned above.

But when the transmission of a strong torque is necessary, it is desirable and preferred, according to the invention, to couple a single pump 13 with two or more motors such as 14 and 14a.

In the drawings two motors 14 and 14a are indicated. Thereby the bores 39 and 41 in the shaft 12 will be prolonged axially in respect of the shaft, as far as to reach the stationary partition member or distributor plate 43a, attached to the fixed wall 27, against which plate is pressed the housing 23a of the motor 14a by means of the springs 33a disposed in the cylinders 31a.

The arrangement of the ducts, such as 44a and 46a, inside the motor 14a and the distributor plate 43a is like that above described with reference to the ducts inside the motor 14 and the distributor plate 43.

Mechanically, the motor 14a has its cylinder block or housing 23a secured through the shaft 12, which has been elongated to extend through the motor 14a, to the cylinder block 23 of the motor 14. The swash plate 25a corresponding to the plate 25 is articulated to a stationary stub shaft 28a equivalent to the stub shaft 28 and secured on a stationary wall 27a similar to the wall 27. Within practical limits, any number of motors, greater than the two motors 14 and 14a, may be employed and interconnected by the driven shaft, distributor plates, guide plates, and tilting control linkages in a manner similar to that disclosed above. The shaft 12, of course, extends for a length corresponding to the number of motors 14, 14a etc., so as to project outside of the last motor of the speed changing device as shown at the right-hand side of Fig. 1a.

The slidable displacement of the shaft 11, which by virtue of the key 15, may be effected without entrainment of the housing 13, causes the lever 55 to vary the inclination of plate 16 as indicated in dot-dash lines.

At the position illustrated, that is when the plate 16 (Fig. 1) has an inclination and the cam plates 25 and 25a (Fig. 1a) are perpendicular to the rotating shaft, the direct drive is obtained.

If swash or wobble plate 16 becomes perpendicular to the shaft 11, all transmission of power to the swash plate and, hence, to the shaft 12 ceases; this is reached whatever may be the position of the cam-plates 25 and 25a, yet, if plates 16 and 25 and 25a are all perpendicular to the rotating shaft 12, the primary and the secondary shafts remain completely untied and free, while if plate 16 is perpendicular and plates 25 and 25a are inclined, there is no transmission of power between the primary and the secondary shaft, but this latter remains locked.

When power transmission is required again, after being sure that the plates 25 and 25a are inclined, it is necessary only to incline the plate 16 too, by acting on the lever 60. According to the direction of the inclination of plate 16, there will be obtained the forward drive or the rearward drive.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. A hydraulic speed changing device comprising, in combination, a pump having a housing and a driving shaft, a hydraulic motor having a housing and a driven shaft, said pump and said motor being hydraulically coupled with each other, said driving shaft being fixed to said pump housing and extending thereinto, said driven shaft being fixed to said motor housing and extending therethrough coaxially with said driving shaft, one end of said driven shaft extending into said pump housing, a wobble plate within said pump housing and pivotally mounted on said one end of said driven shaft, a stationary stub shaft arranged coaxially with said driven shaft adjacent the other end of the latter, a guide plate pivotally mounted on said stub shaft, a first set of pistons and a second set of pistons, said first and second sets of pistons being reciprocatingly movable in said pump housing and in said motor housing, respectively, and arranged to perform variable strokes, spherically dished shoes receiving the ends of said pistons respectively, spring means urging said pistons and shoes toward said wobble plate and said guide plate, said shoes for said first set of pistons being in sliding contact with and controlled by said wobble plate, said shoes for said second set of pistons being in sliding contact with and controlled by said guide plate, whereby rotative movement of said driving shaft and of said pump housing fixed thereto is hydraulically transmitted to said motor and translated into a rotative movement of said motor housing and of said driven shaft fixed thereto, and means outside said pump housing and said motor housing, respectively, for changing the inclination of said wobble plate and said guide plate, respectively, relative to said driving shaft and said driven shaft.

2. A hydraulic speed changing device comprising, in combination, a pump having a housing and a driving shaft, a plurality of hydraulic motors each having a housing and a common driven shaft, said pump being hydraulically coupled with said motors, said driving shaft being fixed to said pump housing and extending thereinto, said driven shaft being fixed to said motor housings and extending therethrough coaxially with said driving shaft, one end of said driven shaft extending into said pump housing, a wobble plate within said pump housing pivotally mounted on said one end of said driven shaft, a stationary stub shaft and a guide plate for each motor, each guide plate being pivotally mounted on its associated stub shaft, a set of pistons for said pump and a set of pistons for each of said motors, said sets of pistons being reciprocatingly movable in said pump and said motor housings, respectively, and arranged to perform variable strokes, spherically dished shoes receiving the ends of said pistons and slidably bearing against said wobble plate and said guide plates, respectively, spring means urging said pistons and shoes toward said wobble plate and said guide plates, said shoes for said pump set of pistons being in sliding contact with and controlled by said wobble plate, said shoes for said motor sets of pistons being in sliding contact with and controlled by said guide plates, whereby rotative movement of said driving shaft and of said pump housing fixed thereto is hydraulically transmitted to said motors and translated into a rotative movement of said motor housings and of said common driven shaft fixed thereto, and means outside said pump housing and said motor housings, respectively, for changing the inclination of said wobble plate and said guide plates, respectively, relative to said driving shaft and said driven shaft.

3. A hydraulic speed changing device comprising, in combination, a pump and hydraulic motor hydraulically coupled with each other, said pump having a housing and a driving shaft fixed to the housing and extending thereinto, said housing being formed at one end opposite to the driving shaft as a cylinder block comprising a set of pump cylinders arranged around an axis coincident with the axis of the driving shaft, pistons reciprocatingly disposed in said pump cylinders, respectively, and arranged to perform variable strokes, a spring interposed in each of said pump cylinders between the piston and the bottom of the cylinder, said hydraulic motor comprising a cylinder block formed with a set of motor cylinders positioned around an axis coincident with the axis of the cylinder block of said pump, pistons reciprocatingly disposed in said motor cylinders, respectively, and arranged to perform variable strokes, a spring interposed in each of said motor cylinders between the piston and the bottom of the cylinder, a stationary distributor plate interposed between said pump housing and said motor cylinder block, said pump housing and said motor cylinder block being urged into sliding contact with said distributor plate by means of said springs disposed in said pump cylinders and in said motor cylinders, respectively, a driven shaft projecting through said motor cylinder block, said distributor plate and said pump cylinder block and extending at one end into said pump housing and facing said driving shaft, said driven shaft being connected to said motor cylinder block and in rotatory contact with said distributor plate and said pump cylinder block, a swash plate pivotally mounted at said end of the driven shaft which extends into said pump housing, a plurality of spherically dished shoes receiving, respectively, the ends of said pump pistons remote from said springs in said pump cylinders, said swash plate being in sliding contact with said shoes, a stationary stub shaft facing the opposite end of said driven shaft, a guide plate pivotally mounted on said stub shaft, a plurality of spherically dished shoes receiving, respectively, the ends of said motor pistons remote from said springs in said motor cylinders, said guide plate being in sliding contact with said last-named shoes, said pump cylinders and said motor cylinders being, respectively, provided with ports adjacent said bottoms thereof, said driven shaft being provided with annular grooves on its periphery, with longitudinal bores in its interior, and with radial bores interconnecting said annular grooves and said longitudinal bores, said distributor plate being provided with ducts arranged to lead a liquid from said ports adjacent the bottoms of said pump cylinders to said ports adjacent the bottoms of said motor cylinders through said annular grooves, radial bores and longitudinal bores during the rotation of said driving and driven shafts, and means outside said pump housing and said motor cylinder block, respectively, and operatively connected to said swash plate and to said guide plate for changing the inclinations of said swash plate and said guide plate, respectively, relative to said driving shaft and said driven shaft.

4. A hydraulic speed changing device comprising, in combination, a pump and a plurality of hydraulic motors, said pump being hydraulically coupled with said motors, said pump having a housing and a driving shaft fixed to the housing and extending thereinto, the housing being formed at one end opposite to said driving shaft as a cylinder block comprising a set of pump cylinders arranged around an axis coincident with the axis of said driving shaft, pistons reciprocatingly disposed in said pump cylinders, respectively, and arranged to perform variable strokes, a spring interposed in each of said pump cylinders between the piston and the bottom of the cylinder, each of said hydraulic motors comprising a cylinder block formed with a set of motor cylinders positioned around an axis coincident with the axis of the cylinder block of said pump, sets of pistons reciprocatingly disposed in said sets of motor cylinders, respectively, and arranged to perform variable strokes, a spring interposed in each of said motor cylinders between the piston and the bottom of the cylinder, a stationary distributor plate interposed between said pump housing and the cylinder block of the first of said plurality of hydraulic motors, a plurality of stationary stub shafts facing, respectively, the sides of said motor cylinder blocks remote from said pump housing, further distributor plates interposed, respectively, between each cylinder block of the remaining hydraulic motors and the corresponding one of said stub shafts, said pump housing and said cylinder blocks of said motors being urged into sliding contact with their associated distributor plates by means of said springs disposed in said pump cylinders and in said motor cylinders, respectively, a driven shaft common to said plurality of hydraulic motors and projecting through said motor cylinder blocks, said distributor plates and said pump cylinder block and extending at one end into said pump housing and facing said driving shaft, said driven shaft being connected to said motor cylinder blocks and in rotatory contact with said distributor plates and said pump cylinder block, a swash plate pivotally mounted at said end of said driven shaft which extends into said pump housing, a plurality of spherically dished shoes receiving, respectively, the ends of said pump pistons remote from said springs in said pump cylinders, said swash plate being in sliding contact with said shoes, a plurality of guide plates pivotally mounted, respectively, on said stub shafts, a plurality of sets of spherically dished shoes receiving, respectively, the ends of said sets of motor pistons remote from the associated springs in said sets of motor cylinders, said guide plates being in sliding contact with said sets of shoes, respectively, said pump cylinders and said motor cylinders being provided, respectively, with ports adjacent the bottoms thereof, said driven shaft being provided with annular grooves on its periphery, with longitudinal bores in its interior, and with radial bores interconnecting said annular grooves and said longitudinal bores, said distributor plates being provided with ducts arranged to lead a liquid from said ports adjacent the bottoms of said pump cylinders to said ports adjacent the bottoms of said motor cylinders of said plurality of hydraulic motors through the intermediary of said annular grooves, radial bores and longitudinal bores during the rotation of said driving and driven shafts, and means outside said pump housing and said motor cylinder blocks and operatively connected to said swash plate and to said guide plates, respectively, for changing the inclinations of said swash plate and said guide plates, respectively, relative to said driving shaft and said driven shaft.

References Cited in the file of this patent

UNITED STATES PATENTS

| | | |
|---|---|---|
| 1,840,864 | Rayburn et al. | Jan. 12, 1932 |
| 2,114,076 | Gölz | Apr. 12, 1938 |
| 2,151,415 | Bennetch | Mar. 21, 1939 |
| 2,199,081 | Perin | Apr. 30, 1940 |
| 2,562,363 | Nixon | July 31, 1951 |

FOREIGN PATENTS

| | | |
|---|---|---|
| 138,739 | Great Britain | Feb. 19, 1920 |
| 952,536 | France | May 2, 1949 |